United States Patent
Shen

(10) Patent No.: US 11,410,389 B2
(45) Date of Patent: Aug. 9, 2022

(54) POINT CLOUD DISPLAY METHOD AND APPARATUS

(71) Applicant: Huawei Technologies Co., Ltd., Shenzhen (CN)

(72) Inventor: Zuding Shen, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/344,481

(22) Filed: Jun. 10, 2021

(65) Prior Publication Data

US 2021/0304499 A1    Sep. 30, 2021

Related U.S. Application Data

(63) Continuation of application No. PCT/CN2020/103012, filed on Jul. 20, 2020.

(30) Foreign Application Priority Data

Aug. 28, 2019 (CN) .......................... 201910804365.2
Nov. 22, 2019 (CN) .......................... 201911171818.9

(51) Int. Cl.
*G06T 19/00* (2011.01)
*G06T 7/73* (2017.01)
*B60K 35/00* (2006.01)
*G01S 7/51* (2006.01)
*G01S 17/42* (2006.01)
*G06V 20/58* (2022.01)

(52) U.S. Cl.
CPC .............. *G06T 19/00* (2013.01); *B60K 35/00* (2013.01); *G01S 7/51* (2013.01); *G01S 17/42* (2013.01); *G06T 7/73* (2017.01); *G06V 20/58* (2022.01); *B60K 2370/166* (2019.05); *B60K 2370/179* (2019.05); *G06T 2207/10016* (2013.01); *G06T 2207/10028* (2013.01); *G06T 2207/30261* (2013.01); *G06T 2210/22* (2013.01); *G06T 2210/56* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 9,014,903 | B1 | 4/2015 | Zhu et al. |
| 2014/0330479 | A1* | 11/2014 | Dolgov ................ G01S 13/931 701/28 |
| 2017/0242442 | A1 | 8/2017 | Minster |
| 2019/0171212 | A1* | 6/2019 | Wang .................... G05D 1/0246 |
| 2020/0043186 | A1* | 2/2020 | Selviah ............... G06V 10/7515 |

(Continued)

FOREIGN PATENT DOCUMENTS

| | | |
|---|---|---|
| CN | 106485233 A | 3/2017 |
| CN | 107862293 A | 3/2018 |

(Continued)

*Primary Examiner* — Saptarshi Mazumder
(74) *Attorney, Agent, or Firm* — Conley Rose, P.C.

(57) ABSTRACT

A point cloud display method includes determining, from a first point cloud, points describing a target object, where the first point cloud describes a surrounding area of a vehicle in which the in-vehicle system is located, and the target object is to be identified by the in-vehicle system, generating a second point cloud based on the points, and displaying the second point cloud.

20 Claims, 9 Drawing Sheets

(56) References Cited

U.S. PATENT DOCUMENTS

| | | | |
|---|---|---|---|
| 2020/0062179 A1* | 2/2020 | Kim | G01C 21/3682 |
| 2020/0150275 A1* | 5/2020 | Zhu | G06T 17/05 |
| 2020/0279402 A1* | 9/2020 | Cheng | G06K 9/00771 |
| 2020/0405455 A1* | 12/2020 | Nikolskiy | A61B 6/032 |
| 2021/0263135 A1* | 8/2021 | Chen | G01S 17/42 |
| 2021/0304499 A1 | 9/2021 | Shen | |

FOREIGN PATENT DOCUMENTS

| | | |
|---|---|---|
| CN | 108196535 A | 6/2018 |
| CN | 108628301 A | 10/2018 |
| CN | 108985194 A | 12/2018 |
| CN | 109407097 A | 3/2019 |
| CN | 109444916 A | 3/2019 |
| CN | 109840448 A | 6/2019 |
| CN | 110789533 A | 2/2020 |
| CN | 111144211 A | 5/2020 |

* cited by examiner

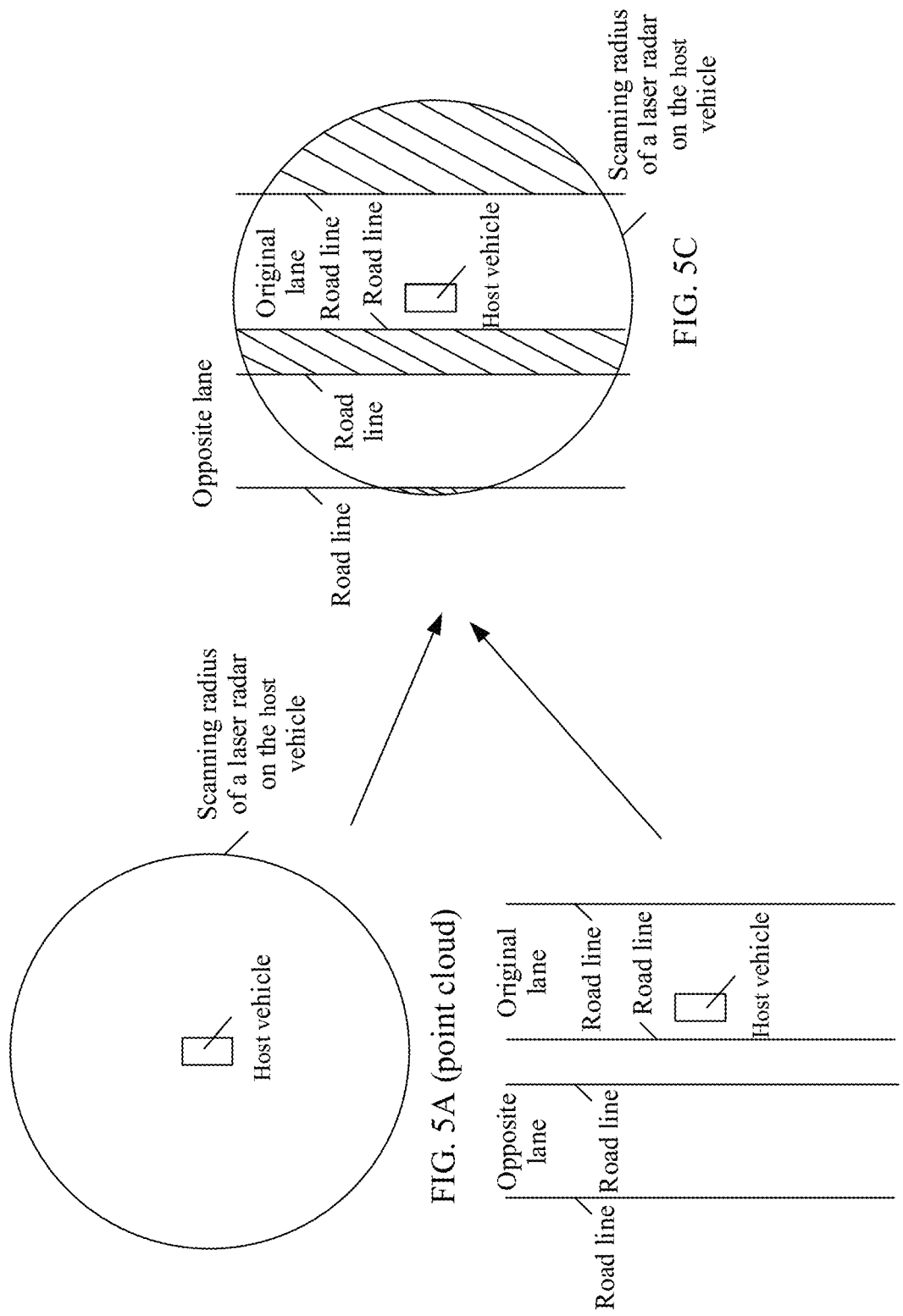

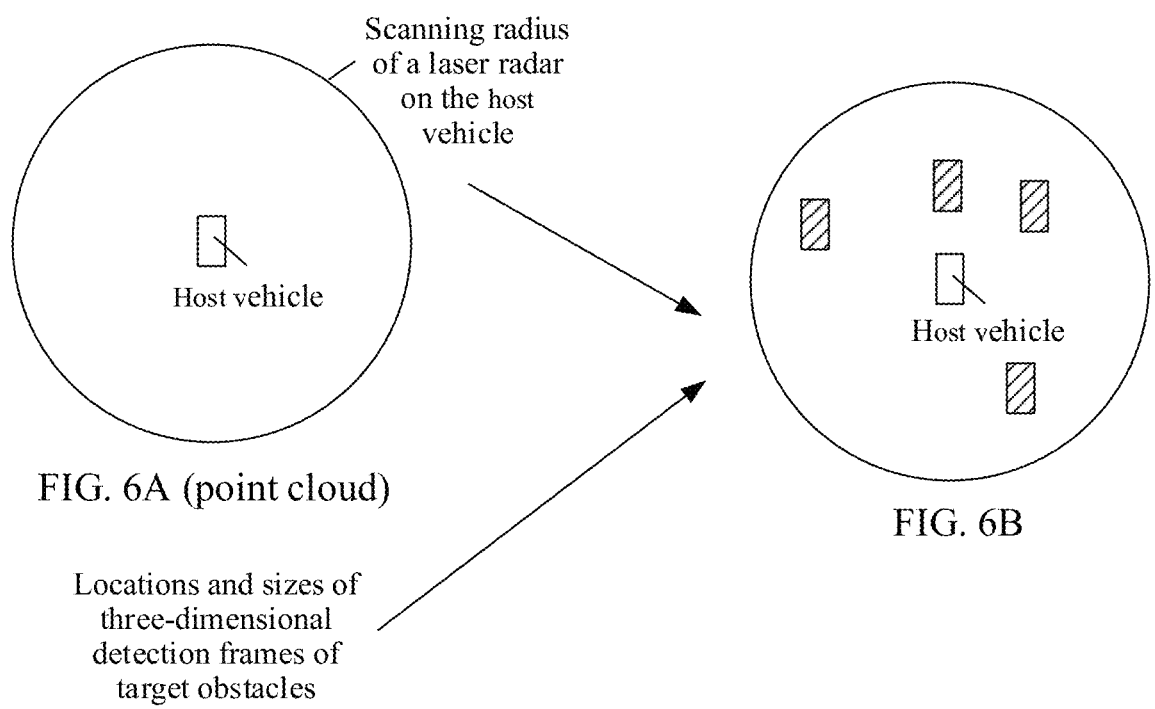

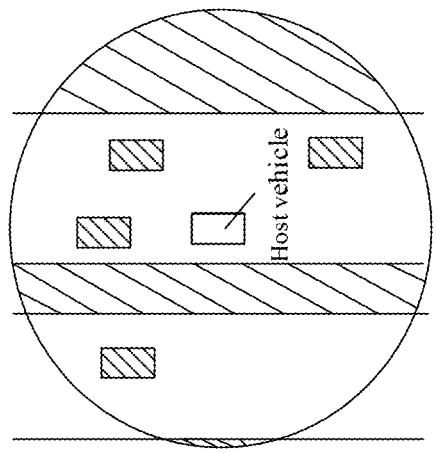
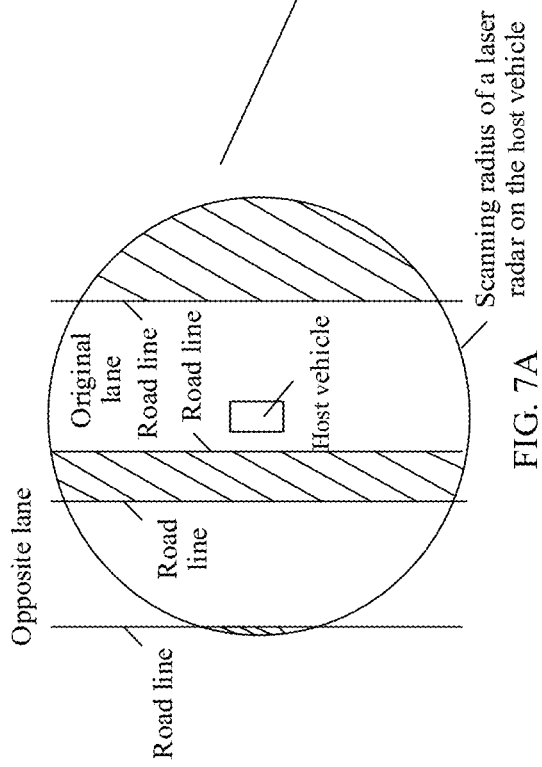
FIG. 7A
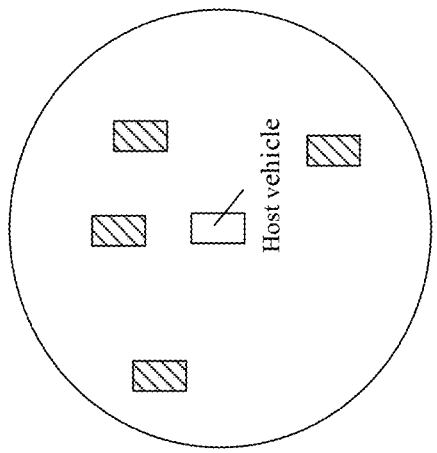
FIG. 7B
FIG. 7C

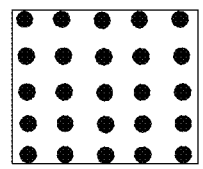 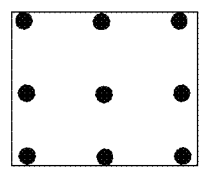
FIG. 8A　　　　　　FIG. 8B
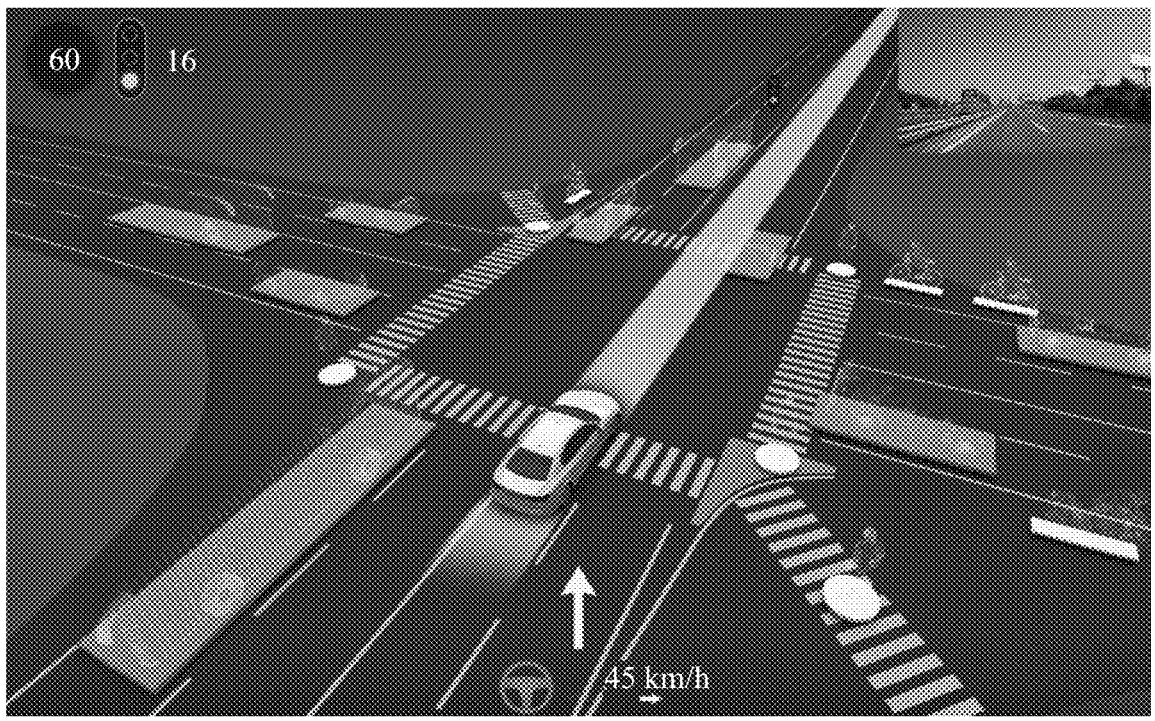
FIG. 9

POINT CLOUD DISPLAY METHOD AND APPARATUS

CROSS-REFERENCE TO RELATED APPLICATIONS

This application is a continuation of International Patent Application No. PCT/CN2020/103012 filed on Jul. 20, 2020, which claims priority to Chinese Patent Application No. 201911171818.9 filed on Nov. 22, 2019 and Chinese Patent Application No. 201910804365.2 filed on Aug. 28, 2019, all of which are hereby incorporated by reference in their entireties.

TECHNICAL FIELD

This application relates to the field of autonomous driving or assisted driving technologies, and in particular, to a point cloud display method and apparatus.

BACKGROUND

With development of economy, a quantity of automobiles increases rapidly, and an automotive technology is integrated with a computer technology in more cases. In recent years, an intelligent automobile has become a new development trend of vehicles. A growing quantity of automobiles use an advanced driver-assistance system (ADAS) and an autonomous driving system. Such systems use an in-vehicle computer (e. g., mobile data center) and an in-vehicle sensor to intelligently detect obstacles during driving, detect an ambient environment, automatically determine a vehicle route, and control a vehicle driving status.

A laser point cloud is a point cloud collected by a laser radar installed on an intelligent vehicle. Because a data amount of the laser point cloud is usually very large, a relatively high requirement is imposed on performance of a hardware device that directly displays the laser point cloud. For example, the hardware device needs to be configured with a high-performance graphics processing unit (GPU) with a 10 gigabit Ethernet (GE) or 10 GE bandwidth. However, performance of a human-machine interface (HMI) device installed on the vehicle is usually relatively low. Consequently, a collected original laser point cloud cannot be directly displayed on the HMI device installed on the vehicle. Therefore, the laser point cloud needs to be processed. How to process the laser point cloud to obtain a point cloud that can be displayed on the HMI device installed on the vehicle is currently an urgent technical problem that needs to be resolved.

SUMMARY

Embodiments of this application provide a point cloud display method and apparatus that can be used to process a laser point cloud, to help obtain a point cloud that can be displayed on an HMI device installed on a vehicle.

According to a first aspect, a point cloud display method is provided and is applied to an in-vehicle system. The method includes determining, from a first point cloud, points used to describe a target object, where the first point cloud is a point cloud used to describe a surrounding area of a vehicle in which the in-vehicle system is located, generating a second point cloud based on the points used to describe the target object, where the target object is an object that needs to be identified by the in-vehicle system, and displaying the second point cloud. In this technical solution, "the second point cloud that is generated based on the points used to describe the target object in the first point cloud" replaces the first point cloud for display. This helps reduce a data amount of a point cloud that needs to be displayed. The technical solution may be used to process a laser point cloud, to reduce a data amount of the laser point cloud that needs to be processed and displayed by the in-vehicle system, thereby lowering a requirement on hardware performance of the in-vehicle system, and helping obtain a point cloud that can be displayed on an HMI device installed on the vehicle.

In a possible implementation, a correlation between the target object and the vehicle exceeds a threshold. The correlation is determined based on at least one of the following factors: a distance between the target object and the vehicle, a location of the target object, information indicated by the target object, or a speed of the target object.

In a possible implementation, before determining, from a first point cloud, points used to describe a target object, the method may further include presenting a setting request, where the setting request is used to prompt a user (for example, a driver of the vehicle) to set a type of an object included in the target object, and determining, based on a received setting response, the type of the object included in the target object. This helps display the target object based on an actual requirement of the user, to enhance flexibility of a point cloud display process and improve user experience.

In a possible implementation, generating a second point cloud based on the points used to describe the target object includes using, as the second point cloud, a set including the points that are extracted from the first point cloud and that are used to describe the target object. Compared with directly displaying the first point cloud, this helps reduce a quantity of points in a displayed point cloud, to lower a requirement on hardware performance of a display device.

In a possible implementation, generating a second point cloud based on the points used to describe the target object includes generating the second point cloud through sparsification on a third point cloud, where the third point cloud is a set of points used to describe the target object. This helps further reduce the quantity of points in the displayed point cloud, to further lower the requirement on the hardware performance of the display device.

In a possible implementation, the third point cloud includes a first area and a second area. A distance between the vehicle and an object described by points in the first area is greater than a distance between the vehicle and an object described by points in the second area. The sparsification on the third point cloud includes performing sparsification on the points in the first area by using a first sparsification multiple, and performing sparsification on the points in the second area by using a second sparsification multiple, where the first sparsification multiple is less than the second sparsification multiple. The sparsification multiple is a ratio of a quantity of points before sparsification to a quantity of points after sparsification in a same area. This possible implementation supports a technical solution in which points farther away from the vehicle are less sparse. This helps describe, by using a relatively large quantity of points, an object that is relatively far away from the vehicle, so that points that are relatively far away from the vehicle are relatively clear while a total quantity of points in the point cloud is reduced, to help improve user experience and improve driving safety.

In a possible implementation, the method further includes performing sampling on an original point cloud sequence obtained by the in-vehicle system, to obtain a first point cloud sequence, where the first point cloud is any frame of point cloud in the first point cloud sequence. This helps reduce computations of point cloud processing.

In a possible implementation, performing sampling on an original point cloud sequence obtained by the in-vehicle system, to obtain a first point cloud sequence includes determining a sampling frequency based on a current scenario of the vehicle in which the in-vehicle system is located, and performing sampling on the original point cloud sequence based on the sampling frequency, to obtain the first point cloud sequence. This helps meet requirements on identification accuracy for the target object in different scenarios, to improve user experience.

In a possible implementation, determining, from a first point cloud, points used to describe a target object includes, when the target object includes an object outside a road (for example, a road on which the vehicle is located), cropping the first point cloud based on a location of a road marking on a map of the surrounding area of the vehicle, to obtain points used to describe the object outside the road.

In a possible implementation, cropping the first point cloud based on a location of a road marking on a map of the surrounding area of the vehicle, to obtain points used to describe the object outside the road may include superimposing a determined surrounding area (for example, a scanning range of a laser radar) of the vehicle on the obtained map of the surrounding area of the vehicle, then, obtaining a closed or semi-closed graph formed by the road marking and the surrounding area (for example, a scanning range of a laser radar) of the vehicle from an image obtained after superimposing and based on the location of the road marking on the map of the surrounding area of the vehicle, and cropping the first point cloud by using a boundary of the closed or semi-closed graph as a cropping boundary, and using a point cloud beyond the boundary as the points used to describe the object outside the road.

In a possible implementation, determining, from a first point cloud, points used to describe a target object includes, when the target object includes a target obstacle on a road (for example, a road on which the vehicle is located), determining the target obstacle based on location information or speed information of the object, and cropping the first point cloud based on a location and a size of the target obstacle, to obtain points used to describe the target obstacle.

In a possible implementation, determining the target obstacle based on location information of the object may include obtaining location information of one or more candidate obstacles, selecting a candidate obstacle on the road from the one or more candidate obstacles based on the location information of the one or more candidate obstacles, and using the selected candidate obstacle as the target obstacle. This can reduce computational complexity of the point cloud.

In a possible implementation, determining the target obstacle based on speed information of the object may include obtaining speed information of one or more candidate obstacles on the road, selecting a candidate obstacle whose speed is greater than a preset threshold (for example, 0) from the one or more candidate obstacles based on the speed information of the one or more candidate obstacles, and using the selected candidate obstacle as the target obstacle. This can reduce computational complexity of the point cloud.

In a possible implementation, determining, from a first point cloud, points used to describe a target object includes cropping the first point cloud based on feature information of a first-type target object, to obtain a first sub-point cloud used to describe the first-type target object, where the target object includes the first-type target object and a second-type target object, and cropping the first point cloud based on feature information of the second-type target object, to obtain a second sub-point cloud used to describe the second-type target object. In this case, generating a second point cloud based on the points used to describe the target object includes generating the second point cloud based on the first sub-point cloud and the second sub-point cloud. It can be learned that in this embodiment of this application, when there is a plurality of types of target objects, the point cloud may be cropped based on feature information of each type of target object, and the second point cloud is generated based on cropping results (that is, sub-point clouds).

According to a second aspect, a point cloud processing method is provided and is applied to an in-vehicle system. The method includes determining, from a first point cloud, points used to describe a target object, where the first point cloud is a point cloud used to describe a surrounding area of a vehicle in which the in-vehicle system is located, and generating a second point cloud based on the points used to describe the target object, where the target object is an object that needs to be identified by the in-vehicle system. Optionally, the second point cloud is used for display. For possible implementations and beneficial effects of the point cloud processing method, refer to the related possible implementations and beneficial effects of the first aspect. Details are not described herein again.

According to a third aspect, a point cloud display apparatus is provided configured to perform the method according to the first aspect or any one of the possible implementations of the first aspect. The apparatus may be an in-vehicle device or a chip.

In a possible implementation, the apparatus includes modules configured to perform the method according to the first aspect or any one of the possible implementations of the first aspect.

In a possible implementation, the apparatus includes a memory, a processor, and a display. The memory is configured to store computer instructions, and the processor is coupled to the display. When the apparatus runs, the processor executes the computer instructions in the memory, to perform, by using hardware resources in the apparatus, the operation steps of the method provided in the first aspect or any one of the possible implementations of the first aspect.

According to a fourth aspect, a point cloud processing apparatus is provided configured to perform the method according to the second aspect or any one of the possible implementations of the second aspect. The apparatus may be an in-vehicle device or a chip.

In a possible implementation, the apparatus includes modules configured to perform the method according to the second aspect or any one of the possible implementations of the second aspect.

In another possible implementation, the apparatus includes a memory and a processor. The memory is configured to store computer instructions. When the apparatus runs, the processor executes the computer instructions in the memory, to perform, by using hardware resources in the apparatus, the operation steps of the method provided in the second aspect or any one of the possible implementations of the second aspect.

According to a fifth aspect, a computer readable storage medium is provided. The computer readable storage medium stores a computer program. When the computer program is run on a computer, the computer is enabled to perform the operation steps of the method provided in the first aspect or any one of the possible implementations of the first aspect, or the second aspect or any one of the possible implementations of the second aspect.

According to a sixth aspect, a computer program product is provided. When the computer program product is run on a computer, the computer is enabled to perform the operation steps of the method provided in the first aspect or any one of the possible implementations of the first aspect, or the second aspect or any one of the possible implementations of the second aspect.

It may be understood that any one of the point cloud display apparatus, the point cloud processing apparatus, the computer-readable storage medium, the computer program product, or the in-vehicle system provided above is configured to perform the corresponding method provided above. Therefore, for beneficial effects that can be achieved by the point cloud display apparatus, the point cloud processing apparatus, the computer-readable storage medium, the computer program product, or the in-vehicle system, refer to beneficial effects in the corresponding method. Details are not described herein again.

BRIEF DESCRIPTION OF DRAWINGS

FIG. 5A, FIG. 5B, and FIG. 5C are a schematic diagram of a process of obtaining points used to describe an object outside a road according to an embodiment of this application.

FIG. 6A and FIG. 6B are a schematic diagram of a process of obtaining points used to describe a target obstacle on a road according to an embodiment of this application.

FIG. 7A, FIG. 7B, and FIG. 7C are a schematic diagram of a process of generating a second point cloud according to an embodiment of this application.

FIG. 8A and FIG. 8B are a schematic diagram of a sparsification method applicable to an embodiment of this application.

FIG. 9 shows a new point cloud obtained after a third point cloud is combined with information such as a road marking on a map according to an embodiment of this application.

DESCRIPTION OF EMBODIMENTS

Figure 1:
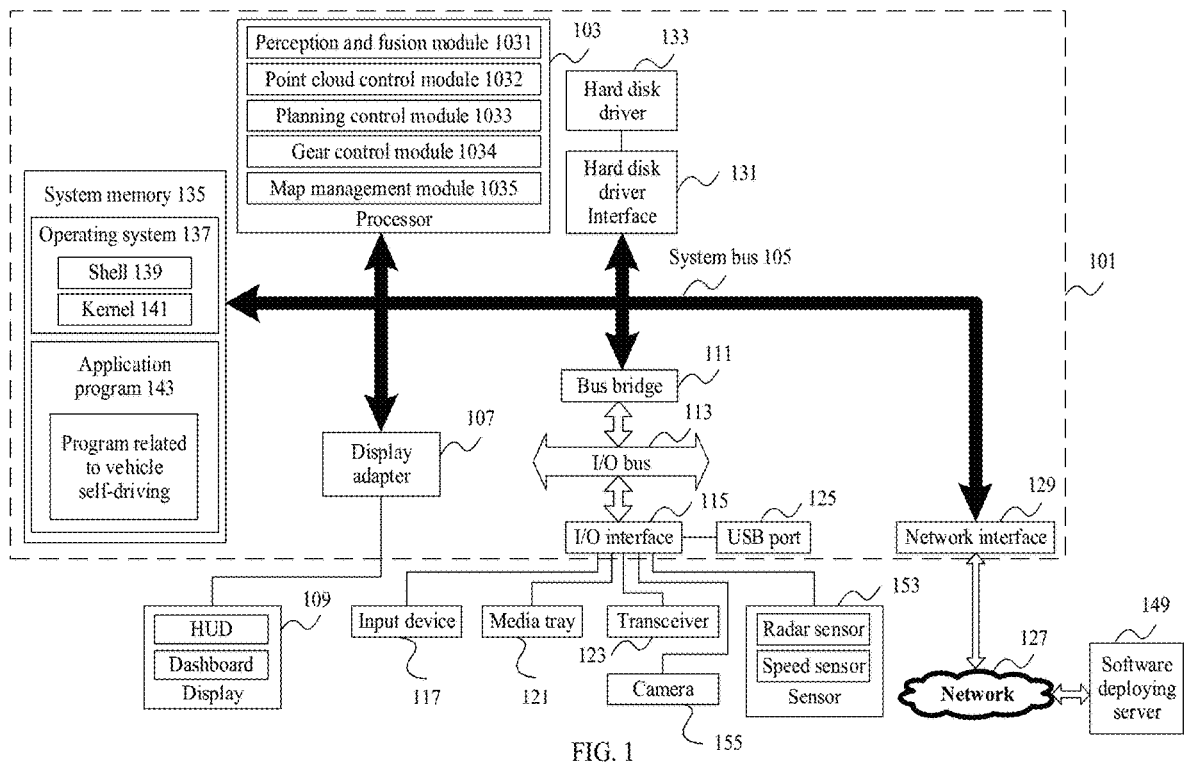
FIG. 1 is a schematic structural diagram of a computer system according to an embodiment of this application.

FIG. 1 is a schematic structural diagram of a computer system (or an in-vehicle system) applicable to an embodiment of this application. The computer system may be located on a vehicle. The computer system may include an in-vehicle device 101, a device/component/network directly or indirectly connected to the in-vehicle device 101, and the like. Referring to FIG. 1, the in-vehicle device 101 includes a processor 103, and the processor 103 is coupled to a system bus 105. The processor 103 may be one or more processors, and each processor may include one or more processor cores. A display adapter 107 may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (for example, a keyboard, a mouse, and a touchscreen), a media tray 121 (for example, a compact disc (CD) read-only memory (ROM) (CD-ROM), and a multimedia interface), a transceiver 123 (which may send and/or receive a radio communication signal), a Universal Serial Bus (USB) port 125, and a camera 155 (which may capture static and dynamic digital video images).

The processor 103 may be any conventional processor, including a reduced instruction set computing (RISC) processor, a complex instruction set computing (CISC) processor, or a combination thereof. Optionally, the processor may be a dedicated apparatus such as an application-specific integrated circuit (ASIC). Optionally, the processor 103 may be a neural processing unit or a combination of a neural processing unit and the foregoing conventional processor. Optionally, the processor 103 may include a main controller (or a central controller) and an ADAS controller. The main controller is a control center of the computer system. The ADAS controller is configured to control a self-driving route, an assisted self-driving route, or the like.

The display 109 may be any one or more HMI devices installed on the vehicle. For example, the display 109 may include a head-up display (HUD), a dashboard, and a display dedicated for a passenger.

Optionally, in various embodiments described in this specification, the in-vehicle device 101 may be located far away from a self-driving vehicle, and may wirelessly communicate with the self-driving vehicle. In other aspects, some of the processes described in this specification are performed by a processor disposed in a self-driving vehicle, and others are performed by a remote processor.

The in-vehicle device 101 may communicate with a software deploying server 149 through a network interface 129. The network interface 129 is a hardware network interface such as a network interface card. A network 127 may be an external network such as the internet, or an internal network such as the Ethernet or a virtual private network (VPN). Optionally, the network 127 may alternatively be a wireless network such as a WI-FI network or a cellular network.

A hard disk drive interface is coupled to the system bus 105. The hardware driver interface is connected to a hard disk driver. A system memory 135 is coupled to the system bus 105. Data running in the system memory 135 may include an operating system 137 and an application program 143 of the in-vehicle device 101.

The operating system includes a shell 139 and a kernel 141. The shell 139 is an interface between a user and the kernel of the operating system. The shell is an outermost layer of the operating system. The shell manages interaction between the user and the operating system waiting for an input of the user, explaining the input of the user to the operating system, and processing various output results of the operating system.

The kernel 141 includes components of the operating system that are configured to manage a memory, a file, a peripheral, and system resources. The kernel 141 directly interacts with hardware. The kernel of the operating system usually runs processes, and provides communication between processes, central processing unit (CPU) time slice management, interrupt management, memory management, I/O management, and the like.

The application program 143 includes a program related to controlling self-driving of a vehicle, for example, a program used to process an image that includes image information on a road of the vehicle and that is obtained by the in-vehicle device, such as a program used to implement the image processing method provided in the embodiments of this application, for another example, a program used to manage interaction between the self-driving vehicle and an obstacle on the road, a program used to control a route or a speed of the self-driving vehicle, and a program used to control interaction between the self-driving vehicle and another self-driving vehicle on the road. The application program 143 also exists on a system of the software deploying server 149. In an embodiment, when the application program 143 needs to be executed, the in-vehicle device 101 may download the application program 143 from the software deploying server 149.

A sensor 153 is associated with the in-vehicle device 101. The sensor 153 is configured to detect an ambient environment of the in-vehicle device 101. For example, the sensor 153 may detect an animal, a vehicle, an obstacle, and a crosswalk. Further, the sensor may detect ambient environments of the foregoing objects such as the animal, the vehicle, the obstacle, and the crosswalk. For example, the sensor may detect the ambient environment of the animal, such as another animal, a weather condition, and brightness of the ambient environment of the animal. Optionally, if the in-vehicle device 101 is located on a self-driving vehicle, the sensor may be a camera, an infrared sensor, a chemical detector, a microphone, or the like. Optionally, the sensor 153 may include a speed sensor configured to measure speed information (such as a speed and an acceleration) of the vehicle (that is, the vehicle in which the computer system shown in FIG. 1 is located), and an angle sensor configured to measure direction information of the vehicle, a relative angle between the vehicle and an object around the vehicle, and the like.

Optionally, the sensor 153 may include a laser radar sensor configured to detect a reflected signal of a laser signal sent by a laser radar, to obtain a laser point cloud. The laser radar may be installed at top of the vehicle to send a laser signal. The point cloud described in the embodiments of this application may be a laser point cloud.

In some embodiments of this application, for ease of understanding, according to functions implemented by the processor 103, the processor 103 may include a perception and fusion module 1031 configured to determine information (for example, a location and a size of an obstacle) about the obstacle in a surrounding area of the vehicle, a weather condition (for example, a sunny day or a rainy day) outside the vehicle, and the like, a point cloud control module 1032 configured to perform a point cloud processing method described in the embodiments of this application, a planning control module 1033 configured to plan a self-driving route or an assisted self-driving route based on an output result of a module such as the perception and fusion module 1031 and/or the point cloud control module 1032, a gear control module 1034 configured to control gears of the vehicle, where the gears may include a park gear, a reverse gear, a neutral gear, a forward gear, and the like, and a map management module 1035 configured to manage a map (for example, a high-definition map), for example, update the map, and obtain information about a map in a specific surrounding area of the vehicle based on a current location of the vehicle. The sent information about the map includes road markings in the specific surrounding area of the vehicle, for example, a road line, a lane line, and a stop line. The map management module 1035 may further exchange information with the point cloud control module 1032, so that the point cloud control module 1032 obtains a road marking and the like in a surrounding area of the vehicle.

The map may be stored in a memory included in the computer system. The memory may be a memory specially used to store a map, or may be a general-purpose memory. This is not limited in the embodiments of this application.

All the foregoing modules (for example, the perception and fusion module 1031, the point cloud control module 1032, the planning control module 1033, the gear control module 1034, and the map management module 1035) may be implemented by using software and/or hardware. In addition, any one or more of the modules may be disposed independently, or may be integrated together. This is not limited in the embodiments of this application. In an example, any one or more of these modules may be used as a logical function module in the main controller or the ADAS controller.

It should be noted that the computer system shown in FIG. 1 is merely an example, and does not constitute a limitation on a computer system to which the embodiments of this application are applicable.

Figure 2A:
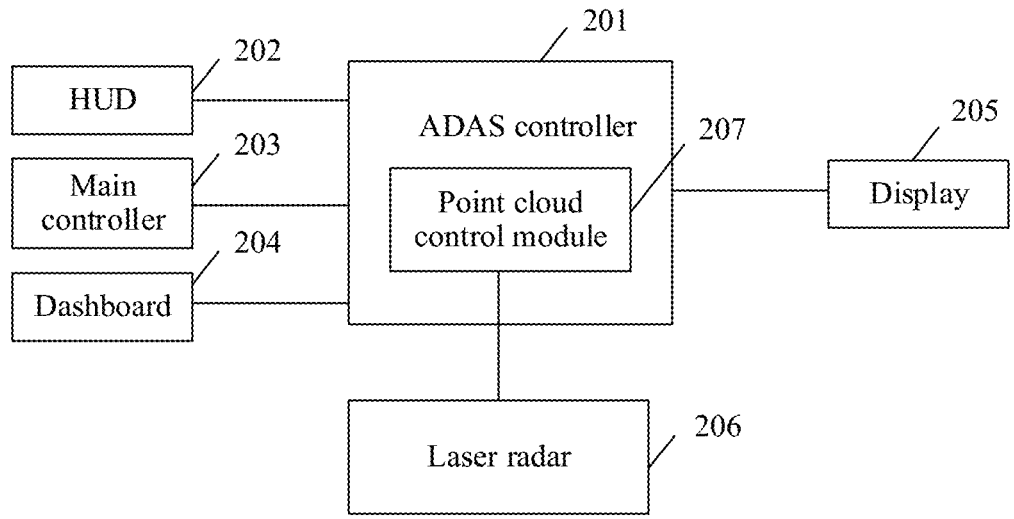
FIG. 2A is a schematic structural diagram of another computer system according to an embodiment of this application.
Figure 2B:
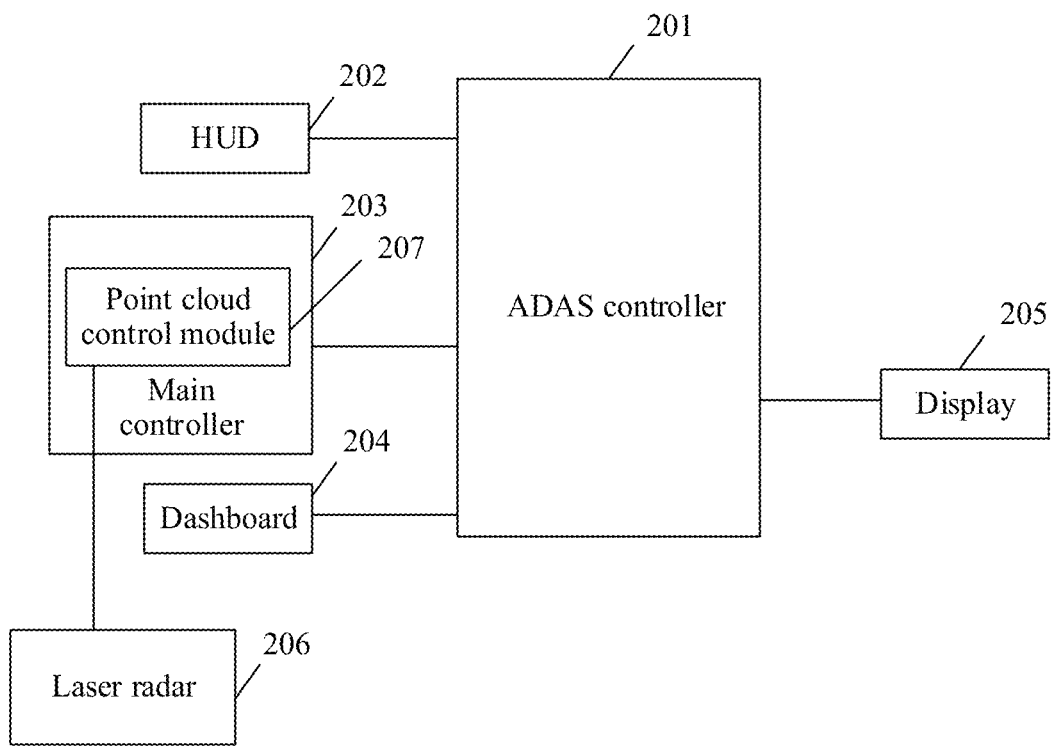
FIG. 2B is a schematic structural diagram of another computer system according to an embodiment of this application.

FIG. 2A and FIG. 2B are schematic structural diagrams of other computer systems according to an embodiment of this application. Each of the computer systems shown in FIG. 2A and FIG. 2B may include an ADAS controller 201, a HUD 202 connected to the ADAS controller 201, a main controller 203 (that is, a central controller), a dashboard 204, and a display 205 dedicated for a passenger. For functions of these components, refer to the foregoing descriptions. Details are not described herein again.

In FIG. 2A, a point cloud control module 207 is located in the ADAS controller 201. In FIG. 2B, a point cloud control module 207 is located in the main controller 203. The point cloud control module 207 may be a software program, and is configured to implement another step other than a display step in a point cloud display method provided in the embodiments of this application. The computer system further includes a laser radar 206, and the laser radar 206 may be connected to the point cloud control module 207.

The following explains some terms or technologies in the embodiments of this application.

(1) Objects:

In the embodiments of this application, the objects include objects on a road and objects outside a road.

The objects on a road include people, a vehicle, a traffic light, a traffic sign (for example, a speed limit sign), a traffic sign post, and a foreign object. The foreign object is to an object that should not appear on the road, such as a carton and a tire left on the road.

The objects outside a road include buildings and trees on both sides of the road, and a median strip in the middle of the road.

(2) Target Object:

The target object is an object that needs to be identified by an in-vehicle device (or an in-vehicle system).

The target object may be predefined, or indicated by a user. In some embodiments of this application, the target object includes a target obstacle on a road and some or all objects outside the road. For a vehicle running on a road, all objects on the road except the vehicle may be considered as obstacles. The target obstacle may be an obstacle of a specific type. For example, the target obstacle may be people or a vehicle. For another example, in some embodiments of this application, the target obstacle may be an obstacle whose speed is greater than or equal to a preset threshold (for example, 0).

In some implementations of this application, for a vehicle, a correlation between a target object and the vehicle exceeds a threshold. The correlation is determined based on at least one of the following factors: a distance between the target object and the vehicle, a location of the target object, information indicated by the target object, or a speed of the target object.

A type of information used to represent the location of the target object is not limited in the embodiments of this application. For example, the location of the target object may be that the target object is on a road or outside a road, or the target object is located in a direction of the vehicle.

The information indicated by the target object may be understood as whether the target object indicates predefined information. For example, the correlation may be determined based on whether the target object indicates traffic information.

A method for determining the correlation between the target object and the vehicle based on the foregoing factors is not limited in the embodiments of this application. For example, a target object closer to the vehicle has a higher correlation with the vehicle. A correlation between the vehicle and a target object on a road on which the vehicle is located is higher than a correlation between the vehicle and a target object outside the road on which the vehicle is located. A correlation between the vehicle and a target object in front of the vehicle is higher than a correlation between the vehicle and a target object right behind the vehicle. A correlation between the vehicle and a target object at a relatively high speed is higher than a correlation between the vehicle and a target object at a relatively low speed.

(3) Surrounding Area of a Vehicle:

A surrounding area of a vehicle is a specific scope around the vehicle.

For example, when a point cloud in the embodiments of this application is a point cloud collected by a laser radar, the surrounding area of the vehicle may be determined based on an installation location and a scanning radius of the laser radar. For example, the surrounding area of the vehicle may be a circular area centered on the laser radar with a radius of the scanning radius of the laser radar.

It should be noted that, during specific implementation, an obtained surrounding area of the vehicle may not be a circle due to factors such as existence of an obstacle (for example, a wall) in an environment in which the vehicle is located. For ease of description, in the following specific examples, an example in which the surrounding area of the vehicle is a circle is used for description.

(4) Point Cloud Cropping:

The point cloud cropping means processing a point cloud to obtain a part of the point cloud. A point cloud cropping process may include determining a cropping boundary, cropping the point cloud based on the cropping boundary, and using an image within or beyond the cropping boundary as a cropping result.

(5) Vehicle Scenario (that is, a Scenario in which a Vehicle is Located):

A method for distinguishing a scenario in which a vehicle is located is not limited in the embodiments of this application. The following lists several specific implementations provided in the embodiments of this application.

Manner 1: The scenario in which the vehicle is located is distinguished based on a driving status of the vehicle.

For example, the scenario in which the vehicle is located may be classified into a parking scenario and a non-parking scenario depending on whether the vehicle is being parked.

For another example, the scenario in which the vehicle is located may be classified into a reverse scenario and a non-reverse scenario depending on whether the vehicle is being reversed.

For another example, the scenario in which the vehicle is located may be classified into a turning scenario and a go-straight scenario depending on whether the vehicle is going straight.

In an example, the point cloud control module may obtain, from the planning control module, whether the vehicle is currently in the parking scenario, obtain, from the gear control module, whether the vehicle is in the reverse scenario, and obtain, from an angle sensor, whether the vehicle is currently in the turning scenario and the go-straight scenario.

For the planning control module or the gear control module:

In an implementation, the point cloud control module may send a request message to the planning control module, and the planning control module sends, to the point cloud control module based on the request message, a response message indicating whether the vehicle is currently in the parking scenario. The point cloud control module may send a request message to the gear control module, and the gear control module sends, to the point cloud control module based on the request message, a response message indicating whether the vehicle is currently in the reverse scenario.

In another implementation, when the vehicle is currently in the parking scenario, the planning control module may send, to the point cloud control module, indication information used to indicate that the vehicle is currently in the parking scenario. When determining that the vehicle is currently in the reverse scenario, the gear control module may send, to the point cloud control module, indication information used to indicate that the vehicle is currently in the reverse scenario.

From a perspective of the angle sensor, the angle sensor may periodically (or in real time) send current direction information of the vehicle to the point cloud control module, and the point cloud control module may determine, based on the direction information, whether the vehicle is currently in the turning scenario and the go-straight scenario.

Manner 2: The scenario in which the vehicle is located is distinguished based on a weather condition of an environment in which the vehicle is located.

Based on this, for example, the scenario in which the vehicle is located may include a sunny day scenario, a rain scenario, a cloudy scenario, a hail scenario, and a haze scenario. Optionally, the foregoing scenarios may be further divided at a finer granularity. For example, the rain scenario may be further divided into a heavy rain scenario, a moderate rain scenario, and a light rain scenario.

For example, the point cloud control module may obtain, from the perception and fusion control module, the weather condition of the environment in which the vehicle is located, to determine, based on the weather condition, the scenario in which the vehicle is currently located. The perception and fusion control module may periodically send or may be triggered to send the weather condition of the environment in which the vehicle is located to the point cloud control module.

Manner 3: The scenario in which the vehicle is located is distinguished based on a light condition of an environment in which the vehicle is located.

Based on this, for example, the scenario in which the vehicle is located may include a daytime scenario and a nighttime scenario. The point cloud control module may obtain, from the perception and fusion control module, whether the current scenario of the vehicle is the daytime scenario or the nighttime scenario.

Manner 4: The scenario in which the vehicle is located is distinguished based on a road condition of a road on which the vehicle is located.

For example, the scenario in which the vehicle is located is distinguished based on a road width of the road on which the vehicle is located. Based on this, for example, the scenario in which the vehicle is located may include a wide-road scenario and a narrow-road scenario. It may be understood that the wide-road scenario and the narrow-road scenario herein are relative. For example, when the width of the road on which the vehicle is located is greater than or equal to a threshold, it may be considered that the vehicle is currently in the wide-road scenario. When the width of the road on which the vehicle is located is less than the threshold, it may be considered that the vehicle is currently in the narrow-road scenario.

For another example, the scenario in which the vehicle is located is distinguished based on whether the road on which the vehicle is located is an intersection. Based on this, for example, the scenario in which the vehicle is located may include an intersection scenario and a non-intersection scenario.

It should be noted that in any one of the foregoing manners, information obtained by the point cloud control module from another device/module/component may be information used to obtain the current scenario of the vehicle, but a result is not limited to the current scenario. For example, the point cloud control module may obtain, from the perception and fusion module, the light condition of the environment in which the vehicle is located, to determine, based on the light condition, whether the current scenario is the daytime scenario or the nighttime scenario. Other examples are not enumerated. Certainly, if the other device/module/component can directly obtain the current scenario of the vehicle, the another device/module/component may exchange information with the point cloud control module, so that the point cloud control module obtains the current scenario of the vehicle.

In addition, it should be noted that, when no conflict occurs, some or all features in any plurality of the foregoing examples may be used in combination, to constitute a new example. For example, when the scenario in which the vehicle is located is distinguished based on whether the vehicle is being reversed and the road width of the road on which the vehicle is located, the scenario in which the vehicle is located may include a wide-road reverse scenario, a wide-road non-reverse scenario, a narrow-road reverse scenario, and a narrow-road non-reverse scenario. Other examples are not enumerated.

(6) Other Terms:

In the embodiments of this application, the word such as "example" or "for example" is used to give an example, an illustration, or a description. Any embodiment or design scheme described as the word "example" or "for example" in the embodiments of this application should not be explained as being more preferred or having more advantages than another embodiment or design scheme. Exactly, use of the word "example" or "for example" or the like is intended to present a related concept in a specific manner.

In the embodiments of this application, "at least one" means one or more. "A plurality" refers to two or more than two.

The term "and/or" in the embodiments of this application describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

With reference to the accompanying drawings, the following describes an image processing method provided in the embodiments of this application. The method may be applied to the computer system shown in FIG. 1.

Figure 3:
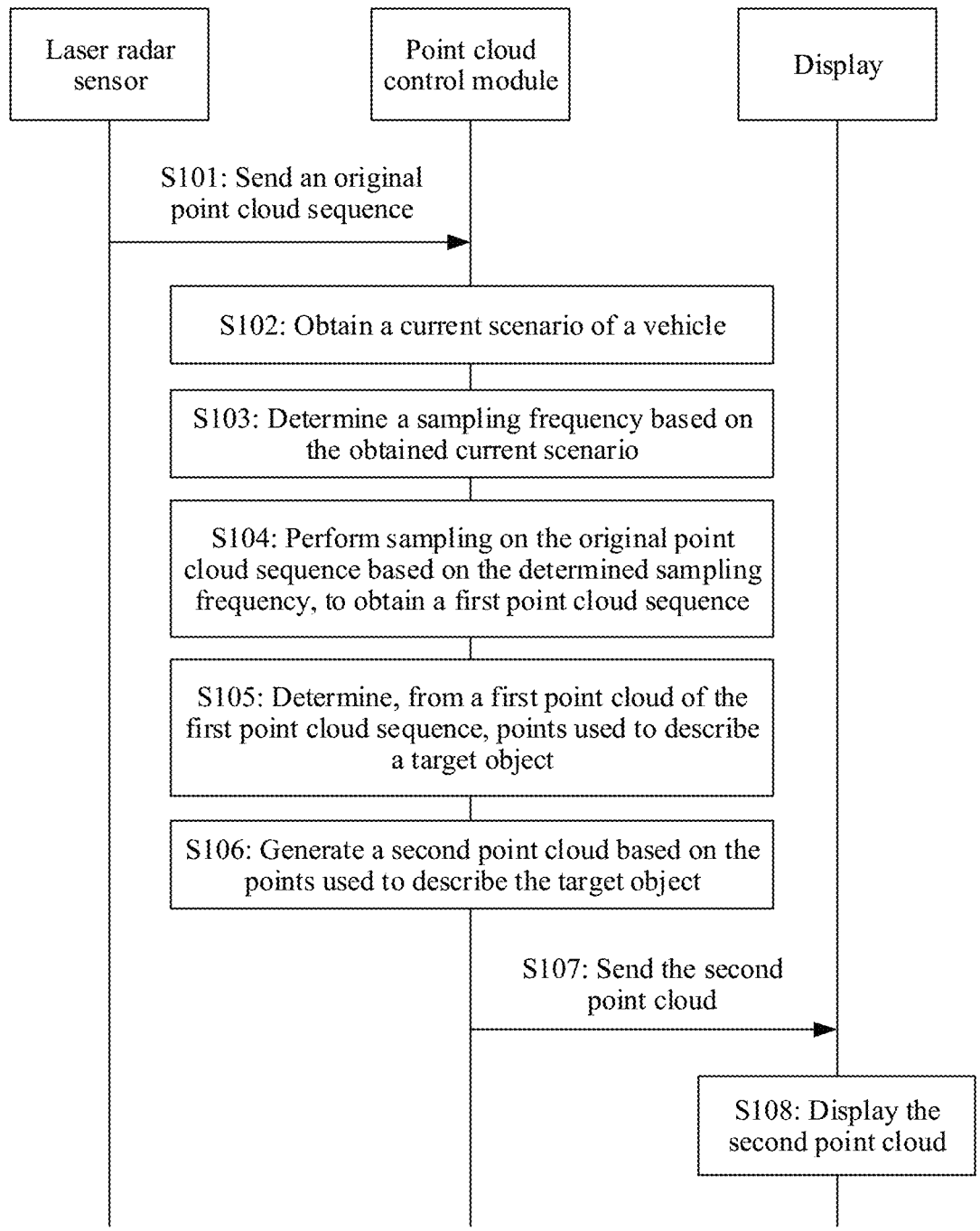
FIG. 3 is a schematic flowchart of an image processing method according to an embodiment of this application.

FIG. 3 is a schematic flowchart of an image processing method according to an embodiment of this application. The method shown in FIG. 3 may include the following steps.

S101: A laser radar sensor sends an original point cloud sequence to a point cloud control module.

The original point cloud sequence is a point cloud sequence formed by point clouds collected by the laser radar sensor. A collection time of a point cloud in the front of the original point cloud sequence is earlier than a collection time of a point cloud in the rear of the original point cloud sequence. A collection time of a point cloud is a time at which the laser radar sensor collects the point cloud. The original point cloud sequence in S101 may be a point cloud sequence formed by any frames of point clouds sent by the laser radar sensor to the point cloud control module.

Optionally, the laser radar sensor may periodically send collected point clouds to the point cloud control module. In this case, a sequence formed by point clouds sent in each period may be used as an original point cloud sequence.

Each frame of point cloud collected by the laser radar sensor is a point cloud used to describe an object in a surrounding area of a vehicle in which the point cloud control module is located. It may be understood that, as the vehicle moves or an object in the surrounding area of the vehicle changes, point clouds of different frames collected by the laser radar sensor may be different.

S102: The point cloud control module obtains a current scenario of the vehicle (referred to as a host vehicle below) in which the point cloud control module is located. The current scenario of the host vehicle may be any scenario described in the foregoing examples of distinguishing a scenario in which a vehicle is located. For example, the current scenario includes a nighttime scenario or a rain scenario. Alternatively, the current scenario of the host vehicle may be a plurality of scenarios distinguished according to a plurality of standards. For example, the current scenario includes a nighttime scenario and a rain scenario.

S103: The point cloud control module determines a sampling frequency based on the current scenario of the host vehicle. The sampling frequency is a sampling frequency used when sampling is performed on the original point cloud sequence.

The point cloud control module may predefine a correspondence between each scenario in which the vehicle is located and a sampling frequency corresponding to the scenario. For example, the scenario in which the vehicle is located includes two scenarios: a sunny day scenario and a rain scenario. The point cloud control module may predefine that a sampling frequency corresponding to the sunny day scenario is f1, and a sampling frequency corresponding to the rain scenario is f2.

Each scenario corresponds to one sampling frequency. Different scenarios distinguished according to a same standard correspond to different sampling frequencies, and different scenarios distinguished according to different standards may correspond to a same sampling frequency or different sampling frequencies. For example, sampling frequencies corresponding to the sun day scenario and the rain scenario are different (that is, f1 and f2 are unequal). The sampling frequency in the rain scenario can be the same as or different from that in the nighttime scenario.

In an implementation, if the current scenario includes a plurality of scenarios, the sampling frequency of the current scenario may be a largest sampling frequency in sampling frequencies corresponding to the plurality of scenarios. For example, if the current scenario includes the nighttime scenario and the rain scenario, and the nighttime scenario and the rain scenario correspond to sampling frequencies 5 hertz (Hz) and 10 Hz respectively, the sampling frequency of the current scenario may be 10 Hz.

In another implementation, if the current scenario includes a plurality of scenarios, the sampling frequency of the current scenario may be a sampling frequency obtained after an operation is performed, according to a preset algorithm, on sampling frequencies corresponding to the plurality of scenarios. A specific implementation of the preset algorithm is not limited in this embodiment of this application. For example, if the current scenario includes the nighttime scenario and the rain scenario, and the nighttime scenario and the rain scenario correspond to sampling frequencies 5 Hz and 10 Hz respectively, the sampling frequency of the current scenario may be a sampling frequency obtained after an operation is performed, according to the preset algorithm, on the sampling frequency 5 Hz corresponding to the nighttime scenario and the sampling frequency 10 Hz corresponding to the rain scenario.

Optionally, a sampling frequency corresponding to a special scenario (that is, a scenario in which a road condition is relatively complex) is greater than a sampling frequency corresponding to a common scenario (that is, a scenario in which a road condition is less complex).

For example, a sampling frequency corresponding to a parking scenario is greater than a sampling frequency corresponding to a non-parking scenario. A sampling frequency corresponding to a reverse scenario is greater than a sampling frequency corresponding to a non-reverse scenario. A sampling frequency corresponding to a turning scenario is greater than a sampling frequency corresponding to a go-straight scenario. The sampling frequency corresponding to the rain scenario is greater than the sampling frequency corresponding to the sunny day scenario. The sampling frequency corresponding to the nighttime scenario is greater than a sampling frequency corresponding to a daytime scenario. A sampling frequency corresponding to a narrow-road scenario is greater than a sampling frequency corresponding to a wide-road scenario. A sampling frequency corresponding to an intersection scenario is greater than a sampling frequency corresponding to a non-intersection scenario.

For another example, sampling frequencies corresponding to at least two (for example, all) of the parking scenario, the reverse scenario, the turning scenario, the rain scenario, the nighttime scenario, the narrow-road scenario, and the intersection scenario are the same, and the sampling frequency is greater than a sampling frequency corresponding to another scenario. For example, a sampling frequency corresponding to a common scenario (that is, another scenario other than the intersection scenario and the nighttime scenario) is 1 Hz, the sampling frequency corresponding to the intersection scenario is 5 Hz, and the sampling frequency corresponding to the nighttime scenario is 18 Hz.

It may be understood that, when the vehicle is in different scenarios, identification accuracy of an in-vehicle device for a target object is different. For example, when the vehicle is in the daytime scenario, identification accuracy of the in-vehicle device for the target object is lower compared with that when the vehicle is in the nighttime scenario. In this embodiment, the sampling frequency is determined based on the current scenario of the vehicle. This helps meet requirements on identification accuracy for the target object in different scenarios, to improve user experience.

S104: The point cloud control module performs sampling on the original point cloud sequence based on the determined sampling frequency, to obtain a first point cloud sequence.

The performing sampling on the original point cloud sequence to obtain a first point cloud sequence may be understood as selecting some point clouds in the original point cloud sequence, and forming the first point cloud sequence by using the selected point clouds in a chronological order of sampling times. A method for performing sampling is not limited in this embodiment of this application. For example, uniform sampling may be performed. For example, one frame of point cloud is selected from the original point cloud sequence every n frames, where n is an integer greater than or equal to 1.

For example, it is assumed that when the sampling frequency is 10 Hz, one frame of point cloud is selected from the original point cloud sequence every six frames, and when the sampling frequency is 20 Hz, one frame of point cloud is selected from the original point cloud sequence every three frames. In this case, when the sampling frequency is 10 Hz, the $1^{st}$, $7^{th}$, $13^{th}$, and $20^{th}$, . . . , frames of point clouds may be selected from the original point cloud sequence to form the first point cloud sequence, and when the sampling frequency is 20 Hz, the $1^{st}$, $4^{th}$, $7^{th}$, $10^{th}$, $13^{th}$, $16^{th}$, and $19^{th}$, . . . , frames of point clouds may be selected from the original point cloud sequence to form the first point cloud sequence.

Figure 4:
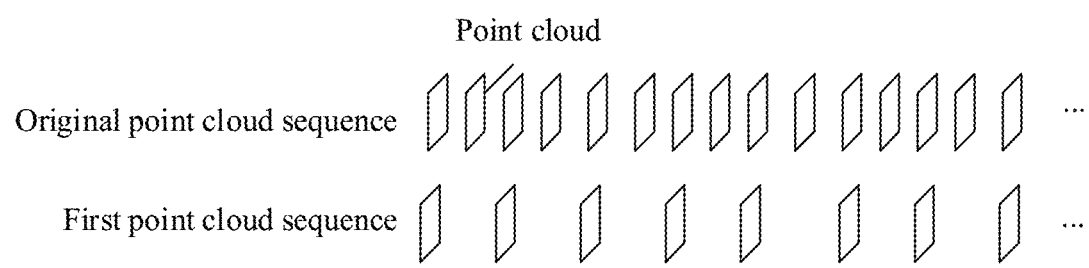
FIG. 4 is a schematic diagram of comparison between an original first point cloud sequence and a first point cloud sequence according to an embodiment of this application.

FIG. 4 is a schematic diagram of comparison between the original point cloud sequence and the first point cloud sequence.

For each frame of point cloud in the first point cloud sequence, the in-vehicle device performs the following steps S105 to S108.

It should be noted that S102 to S104 are optional steps. Sampling is performed on the original point cloud sequence, so that S105 to S108 are performed on a point cloud in the first point cloud sequence obtained through sampling, instead of each frame of point cloud in the original point cloud sequence. This helps reduce computations of point cloud processing. Further, the sampling frequency is determined based on the current scenario of the host vehicle, rather than a same sampling frequency is used in all scenarios. This helps meet requirements on identification accuracy for the target object in different scenarios, to help balance the computations of point cloud processing and the requirements on identification accuracy for the target object, and improving an overall effect of point cloud processing.

S105: The point cloud control module determines, from a first point cloud in the first point cloud sequence, points used to describe the target object. The first point cloud may be any frame of point cloud in the first point cloud sequence.

Further, the point cloud control module crops the first point cloud to obtain the points used to describe the target object (for example, each target object) in the first point cloud.

Optionally, before S105, the method may further include presenting a setting request, where the setting request is used to prompt a driver of the host vehicle to set a type of an object included in the target object, and then, determining, based on a received setting response, the type of the object included in the target object. A presentation manner of the setting request is not limited in this embodiment of this application. For example, the setting request may be presented by a display by using text or a picture, presented by a speaker by using audio, or a combination of the two. The type of an object may include people, a bicycle, an electric bicycle, a car, a truck, a traffic sign pole, and the like. In this optional implementation, a user (for example, the driver) is supported to set types of some or all target objects. This helps display the target object based on an actual requirement of the user, to enhance flexibility of a point cloud display process and improve user experience.

In some implementations, types of some or all target objects may be predefined. In some other implementations, types of some target objects are predefined, and types of the other target objects may be set by a user.

A specific implementation of S105 is described below based on a relationship between the target object and a road.

First, when the target object includes an object outside a road (for example, a road on which the host vehicle is located), the point cloud control module crops the first point cloud based on a location of a road marking on a map of the surrounding area of the host vehicle, to obtain points used to describe the object outside the road.

Optionally, the road marking may include at least one of a road line, a lane line, and a stop line. A location of the road marking may be an absolute location or a relative location.

The map may be prestored in a memory of the in-vehicle device, or may be a map application developed by a third party. The map includes coordinate information and sizes of various road markings (for example, a road line, a lane line, and a stop line). The map described herein is a general map, for example, a map including a city or a map including all parts of a country. A map management module may be configured to manage a map stored in the memory. The point cloud control module may send a request message to the map management module, where the request message is used to request to obtain a map of a specific surrounding area of the host vehicle. For example, the request message may include location information of the host vehicle, and the location information of the host vehicle may be obtained by the point cloud control module from a module/component/device configured to position the host vehicle. After receiving the request message, the map management module sends the map of the specific surrounding area of the host vehicle to the point cloud control module. A size of the surrounding area of the host vehicle that is determined by the map management module may be the same as or different from a size of a surrounding area of the host vehicle that is determined by the point cloud control module.

Optionally, that the point cloud control module crops the first point cloud based on a location of a road marking on a map of a surrounding area of the host vehicle, to obtain points used to describe the object other than the road may include the following.

Step 1: The point cloud control module superimposes the determined surrounding area of the host vehicle (for example, a scanning range of a laser radar) on the obtained map of the surrounding area of the host vehicle.

Step 2: The point cloud control module obtains, from an image obtained after the superimposing and based on the location of the road marking on the map of the surrounding area of the host vehicle, a closed or semi-closed graph formed by the road marking and the surrounding area of the vehicle (for example, the scanning range of the laser radar).

Step 3: The point cloud control module crops the first point cloud by using a boundary of the closed or semi-closed graph as a cutting boundary, and uses a point cloud beyond the boundary as the points used to describe the object outside the road.

FIG. 5A to FIG. 5C are a schematic diagram of a process of obtaining the points used to describe the object outside the road. FIG. 5A represents the first point cloud. For ease of understanding, FIG. 5A shows only the host vehicle and the scanning range of the laser radar on the host vehicle. FIG. 5B is the map that is of the surrounding area of the host vehicle and that is obtained by the point cloud control module. The map includes a road marking. In FIG. 5B, an original lane is a lane in which the host vehicle is located, and an opposite lane is a lane in which a vehicle whose driving direction is opposite to that of the host vehicle is located. The point cloud control module may superimpose FIG. 5A on FIG. 5B to obtain FIG. 5C. Locations of the host vehicle in FIG. 5A, FIG. 5B, and FIG. 5C are the same. Boundaries of dash areas in FIG. 5C are cropping boundaries, and the dash areas in FIG. 5C are the points used to describe the object outside the road. FIG. 5C includes three dash areas in total. Dash areas on a leftmost side and a rightmost side may be considered as trees, buildings, and the like outside the road, and a dash area in the middle may be considered as a median strip and the like in the middle of the road.

Second, when the target object includes a target obstacle on a road (for example, a road on which the host vehicle is located), the point cloud control module crops the first point cloud based on a location and a size of the target obstacle on the road, to obtain points that are in the first point cloud and that are used to describe the target obstacle.

The following describes a specific implementation in which the point cloud control module determines the target obstacle in the first point cloud.

Manner 1: The point cloud control module determines the target obstacle based on location information of the object.

For example, the point cloud control module obtains location information of one or more candidate obstacles, selects a candidate obstacle on the road from the one or more candidate obstacles based on the location information of the one or more candidate obstacles, and uses the selected candidate obstacle as the target obstacle.

The candidate obstacle is an obstacle that is in the surrounding area of the host vehicle, that is obtained by the point cloud control module from another device/module/component (for example, the perception and fusion control module), and that is identified by the other device/module/component. The following uses an example in which the other device/module/component is the perception and fusion control module for description.

This embodiment of this application imposes no limitation on a method for identifying an obstacle in the surrounding area of the host vehicle by the perception and fusion control module and the like, a method for obtaining information about the identified obstacle, and a method for exchanging information with the point cloud control module, to enable the point cloud control module to obtain the information.

For example, the perception and fusion control module may periodically send or may be triggered to send, to the point cloud control module, information (such as location information, speed information, length and width information, and classification information) about an obstacle that is in the surrounding area of the host vehicle and that is identified by the point cloud control module.

The location information of the obstacle may be location information used to represent an absolute location or a relative location (for example, a location relative to the host vehicle) of the obstacle. For example, the absolute location of the obstacle may be represented by a longitude and a latitude of a location of the obstacle or coordinate values of the location in a world coordinate system. The location of the obstacle relative to the host vehicle may be represented by coordinate values of the obstacle in a vehicle coordinate system.

The length and width information of the obstacle is a length and a width of a rectangular area occupied by the obstacle on the road (that is, a two-dimensional plane). In an example, the rectangular area may be a rectangular area including "a projection area of the obstacle on a two-dimensional plane on which the road is located".

The classification information of the obstacle is information used to represent a type of the obstacle. The type of the obstacle may include people, a bicycle, an electric bicycle, a car, a truck, a traffic sign pole, or the like.

Manner 1 is a technical solution proposed considering that "for a same vehicle, a size of a surrounding area of the vehicle that is determined by the perception and fusion control module may be the same as or different from a size of a surrounding area of the vehicle that is determined by the point cloud control module, and therefore, a candidate obstacle identified by the perception and fusion control module may be on or outside a road in the surrounding area of the vehicle that is determined by the point cloud control module." In an example, if the size of the surrounding area of the vehicle that is determined by the perception and fusion control module is the same as the size of the surrounding area of the vehicle that is determined by the point cloud control module, the point cloud control module may directly use the obtained candidate obstacle as the target obstacle.

In an implementation, the point cloud control module may obtain the location information of the candidate obstacle from the perception and fusion control module, obtain location information of the road on which the host vehicle is located from the map of the surrounding area of the vehicle, and then, determine, with reference to the location information of the road and the location information of the candidate obstacle, whether the candidate obstacle is on the road.

Manner 2: The point cloud control module determines the target obstacle based on speed information of the object.

For example, the point cloud control module obtains speed information of one or more candidate obstacles on the road, and selects, from the one or more candidate obstacles based on the speed information of the one or more candidate obstacles, a candidate obstacle whose speed is greater than or equal to a preset threshold (for example, 0), and uses the selected candidate obstacle as the target obstacle.

The speed herein may be an absolute speed. That is, the target obstacle selected in Manner 2 is a dynamic obstacle, that is, an obstacle whose location can be moved, such as people or a vehicle. For descriptions of the candidate obstacle, refer to Manner 1.

Manner 2 is a technical solution proposed considering that "the candidate obstacles determined by the perception and fusion control module include a static obstacle (for example, a traffic light or a traffic sign pole) and a dynamic obstacle (for example, people or a vehicle), in the field of autonomous driving or assisted autonomous driving technologies, generally, the dynamic obstacle attracts more attention than the static obstacle, or an obstacle with a higher speed attracts more attention than an obstacle with a lower speed."

Optionally, Manner 1 and Manner 2 may be combined to obtain a new implementation. In other words, this embodiment of this application supports the technical solution in which the point cloud control module uses, as the target obstacle, a candidate obstacle that is on the road and whose speed is greater than or equal to the preset threshold. The technical solution may be described as follows. The point cloud control module filters out, from the obtained candidate obstacles, a static obstacle or an obstacle with a relatively low speed that is located beyond an edge of the road.

The following describes a specific implementation in which the point cloud control module obtains the location and the size of the target obstacle on the road.

The location information of the target obstacle may be obtained by the point cloud control module from another device/module/component (for example, the perception and fusion control module).

The size of the target obstacle may be a length, a width, and a height of a cuboid (that is, a three-dimensional detection frame of the target obstacle) that includes the target obstacle.

In an implementation, it can be learned from the foregoing description that the point cloud control module may obtain the length and the width of the target obstacle from another device/module/component (for example, the perception and fusion control module). The point cloud control module may obtain the height of the target obstacle based on classification information of the target obstacle. For example, a height of an obstacle of each type is predefined. For example, a height of people is 2 meters (m), a height of a bicycle is 2 m, a height of an electric bicycle is 2 m, a height of a car is 3 m, a height of a truck is 4 m, and a height of a traffic sign pole is 5 m. The point cloud control module may obtain the classification information of the target obstacle from another device/module/component (for example, the perception and fusion control module). The three-dimensional detection frame of the target obstacle obtained in this manner is closer to the target obstacle. Therefore, accuracy is high.

In another implementation, the length, the width, and the height of the target obstacle each may be of a predefined size. That is, a size of each target obstacle is represented according to a predefined point cloud model. The predefined point cloud model is a three-dimensional detection frame whose length, width, and height each are of a fixed size. This manner is easy to implement.

After obtaining location information and a size of any target obstacle, the point cloud control module may determine a location and a size of a three-dimensional detection frame (that is, a three-dimensional region that includes the target obstacle) of the target obstacle, to crop the first point cloud based on the three-dimensional detection frame, so as to obtain points that are in the first point cloud and that are used to describe the target obstacle. That is, points in the three-dimensional detection frame in the first point cloud are used as points used to describe the target obstacle. By analogy, the point cloud control module may obtain points that are in the first point cloud and that are used to describe each target obstacle.

FIG. 6A and FIG. 6B are a schematic diagram of a process of obtaining the points used to describe the target obstacle on the road. FIG. 6A represents the first point cloud. For ease of understanding, only the host vehicle and a scanning range of a laser radar on the host vehicle are shown in FIG. 6A. The point cloud control module may obtain, based on FIG. 6A and the obtained location and size of the three-dimensional detection frame of the target obstacle, the location and the size of the target obstacle on the road in FIG. 6A. As shown by dash areas in FIG. 6B, each dash area in FIG. 6B represents one target obstacle.

S106: The point cloud control module generates a second point cloud based on the points used to describe the target object. For example, locations of the points used to describe the target object in the first point cloud are the same as locations of the points in the second point cloud.

If points used to describe each type of target object are used as a sub-point cloud, if the point cloud control module obtains a sub-point cloud used to describe one type of target object after S105, when performing S106, the point cloud control module may directly use the sub-point cloud of the target object as the second point cloud, and if the point cloud control module obtains sub-point clouds used to describe a plurality of types of target objects after S105, when performing S106, the point cloud control module may combine the sub-point clouds used to describe the plurality of types of target objects, to obtain the second point cloud. For example, locations of points used to describe a same target object in the first point cloud are the same as locations of the point in the second point cloud. For example, referring to FIG. 7A to FIG. 7C, it is assumed that a sub-point cloud used to describe the objects outside the road is shown in dash areas in FIG. 7A (that is, FIG. 5C), and a sub-point cloud used to describe the target obstacles on the road is shown in dash areas in FIG. 7B (that is, FIG. 6B). In this case, the dash areas in FIG. 7A and the dash areas in FIG. 7B may be combined, to obtain dash areas (that is, the second point cloud) in FIG. 7C.

Further, when the point cloud obtaining module obtains the sub-point clouds used to describe the plurality of types of target objects, S105 may include the point cloud control module crops the first point cloud based on feature information of a first-type target object, to obtain a first sub-point cloud used to describe the first-type target object, where the target objects include a first-type target object and a second-type target object. The point cloud control module crops the first point cloud based on feature information of the second-type target object, to obtain a second sub-point cloud used to describe the second-type target object. Based on this, S106 may include the point cloud control module generates the second point cloud based on the first sub-point cloud and the second sub-point cloud.

In other words, in this embodiment of this application, when there is a plurality of types of target objects, the point cloud may be cropped based on feature information of each type of target object, and the second point cloud is generated based on cropping results (that is, sub-point clouds).

Feature information of a target object is information used to indicate a type of the target object. For example, when a point cloud that describes an object outside the road and a point cloud that describes a vehicle on the road need to be obtained, feature information of the former may be a location of the object, and feature information of the latter may be a location and a size of the object.

The feature information of the object described above is merely an example, and does not constitute a limitation on feature information applicable to this embodiment of this application. It may be understood that, referring to FIG. 7A to FIG. 7C, compared with the points in the first point cloud, the second point cloud does not include points outside the dash areas in FIG. 7C. These points are ground reflection points generated by the laser radar in a scanning process, and the like. In this way, computational complexity and display complexity of the point cloud can be reduced.

It should be noted that because the target object can be set, during actual implementation, the target object may include more or fewer objects than those described in this embodiment of this application.

In an implementation, S106 may include the point cloud control module uses, as the second point cloud, the points used to describe the target object. Compared with directly displaying the first point cloud, this helps reduce a quantity of points in a displayed point cloud, to lower a requirement on hardware performance of a display device. In addition, this is easy to implement.

In another implementation, S106 may include the point cloud control module performs sparsification on a third point cloud, to obtain the second point cloud. The third point cloud is a set of points used to describe the target object. Compared with the foregoing implementation, this helps further reduce the quantity of points in the displayed point cloud, to further lower the requirement on the hardware performance of the display device.

Sparsification on a point cloud is a process in which to reduce computational complexity or display complexity of the point cloud, sampling is performed on points in the point cloud, to form a new point cloud. Profiles of a same object in point clouds before and after sparsification are consistent or basically consistent. For example, FIG. 8A and FIG. 8B are schematic diagrams of points in a rectangle in point clouds before and after sparsification. FIG. 8A represents the rectangle before sparsification, and FIG. 8B represents the rectangle after sparsification. A sampling method in a sparsification process is not limited in this embodiment of this application.

A sparsification multiple refers to a ratio of a quantity of points that are included in an area before sparsification to a quantity of points that are included in the area after sparsification. For a same area, a larger sparsification multiple indicates a larger sparsity, that is, a smaller quantity of points obtained after sparsification.

An area on which point cloud sparsification is performed may be an area of any size in a frame of point cloud. For example, the point cloud control module may first divide the third point cloud into several grids, and then perform sparsification on points in each different grid. A specific implementation of "dividing the third point cloud into grids" is not limited in this example of this application. For example, reference may be made to the other approaches. In addition, during specific implementation, the point cloud may be further divided into a plurality of areas in another manner.

Optionally, the third point cloud includes a first area and a second area. A distance between the vehicle and an object described by points in the first area is greater than a distance between the vehicle and an object described by points in the second area. Then, sparsification is performed on the points in the first area by using a first sparsification multiple, and sparsification is performed on the points in the second area by using a second sparsification multiple. The first sparsification multiple is less than the second sparsification multiple. Further, optionally, both the first area and the second area are grids.

In other words, this embodiment of this application supports a technical solution in which points farther away from the vehicle are less sparse.

For a same object, a longer distance between the object and the vehicle indicates a smaller quantity of points used to describe the object in the point cloud. In addition, a larger quantity of points used to describe an object indicates clearer description of the object. Therefore, compared with the technical solution of "sparsification on all areas in the third point cloud by using a same sparsification multiple", the optional technical solution helps describe, by using a relatively large quantity of points, an object that is relatively far away from the vehicle. In this way, points that are relatively far away from the vehicle are relatively clear while a total quantity of points in the point cloud is reduced, to help improve user experience and improve driving safety.

S107: The point cloud control module sends the second point cloud to a display. The point cloud control module may directly or indirectly send the second point cloud to the display. For example, the display may be a HUD or a dashboard.

S108: The display displays the second point cloud.

In an implementation, the display may directly display the second point cloud.

In another implementation, the display may superimpose the second point cloud on information (for example, information such as a road marking on the map) about another object in the surrounding area of the vehicle, to obtain a new point cloud, and display the new point cloud. FIG. 9 shows a new point cloud obtained after the second point cloud is combined with the information such as the road marking on the map. In this way, compared with directly displaying the second point cloud, the display may further display more information used to indicate the surrounding area of the vehicle, to further improve user experience.

According to the point cloud display method provided in this embodiment, the points used to describe the target object are determined in the first point cloud, the second point cloud is generated based on the points used to describe the target object, and the second point cloud is displayed. In this method, the second point cloud replaces the first point cloud for display. This helps reduce a data amount of the point cloud that needs to be displayed. Because the first point cloud may be a laser point cloud, this method helps reduce a data amount of the laser point cloud, to help lower the requirement on hardware performance of the display device. In this way, a point cloud that can be displayed on an HMI device installed on the vehicle can be obtained.

The foregoing mainly describes, from a method perspective, the solutions provided in the embodiments of this application. To implement the foregoing functions, corresponding hardware structures and/or software modules for performing the functions are included. A person of ordinary skill in the art should easily be aware that, in combination with the examples described in the embodiments disclosed in this specification, units, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the in-vehicle may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 10:
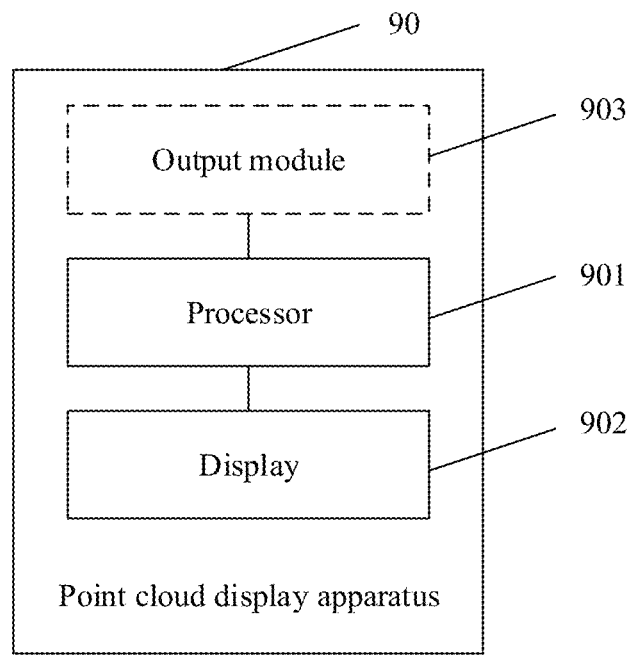
FIG. 10 is a schematic structural diagram of an in-vehicle system according to an embodiment of this application.

FIG. 10 is a schematic structural diagram of a point cloud display apparatus 90 according to an embodiment of this application. The point cloud display apparatus 90 includes a processor 901 and a display 902. The processor 901 and the display 902 may be separate components, or may be integrated together. For example, the processor 901 and the display 902 may be connected in a wired or wireless manner. For example, the processor 901 and the display 902 may be connected through a cable, or may be connected through WI-FI or BLUETOOTH.

The processor 901 may be configured to perform the foregoing steps performed by the point cloud control module. The display 902 may be configured to perform the foregoing steps performed by the display. For example, the processor 901 is configured to determine, from a first point cloud, points used to describe a target object, where the first point cloud is a point cloud used to describe a surrounding area of a vehicle in which the in-vehicle system is located, and the target object is an object that needs to be identified by the in-vehicle system, and generate a second point cloud based on the points used to describe the target object. The display 902 is configured to display the second point cloud. For example, with reference to FIG. 3, the processor 901 may be configured to perform S105 and S106. The display 902 may be configured to perform S108.

Optionally, a correlation between the target object and the vehicle exceeds a threshold. The correlation is determined based on at least one of the following factors a distance between the target object and the vehicle, a location of the target object, information indicated by the target object, or a speed of the target object.

Optionally, the apparatus 90 further includes an output module 903 configured to present a setting request, where the setting request is used to prompt a user (for example, a driver of the vehicle) to set a type of an object included in the target object. The processor 901 is further configured to determine, based on a received setting response, the type of the object included in the target object. The output module 903 and the display 902 may be the same or different. For example, if the presentation setting request is presented by a display, the output module 903 and the display 902 may be a same display, or certainly may be different displays. For another example, if the presentation setting request is presented by a speaker (that is, presented through audio), the output module 903 is different from the display 902.

Optionally, the processor 901 is further configured to generate the second point cloud through sparsification on a third point cloud, where the third point cloud is a set of points used to describe the target object.

Optionally, the third point cloud includes a first area and a second area. A distance between the vehicle and an object described by points in the first area is greater than a distance between the vehicle and an object described by points in the second area. The processor 901 is further configured to perform sparsification on the points in the first area by using a first sparsification multiple, and perform sparsification on the points in the second area by using a second sparsification multiple, where the first sparsification multiple is less than the second sparsification multiple.

Optionally, the processor 901 is further configured to perform sampling on an original point cloud sequence obtained by the in-vehicle system, to obtain a first point cloud sequence, where the first point cloud is any frame of point cloud in the first point cloud sequence.

Optionally, the processor 901 is further configured to determine a sampling frequency based on a current scenario of the vehicle in which the in-vehicle system is located, and perform sampling on the original point cloud sequence based on the sampling frequency, to obtain the first point cloud sequence. For example, with reference to FIG. 3, the processor 901 may be configured to perform S103 and S104.

Optionally, the processor 901 is further configured to, when the target object includes an object outside a road, crop the first point cloud based on a location of a road marking on a map of the surrounding area, to obtain points used to describe the object outside the road.

Optionally, the processor 901 is further configured to, when the target object includes a target obstacle on a road, determine the target obstacle based on location information or speed information of the object, and crop the first point cloud based on a location and a size of the target obstacle, to obtain points used to describe the target obstacle.

Optionally, when the target object includes the target obstacle on the road, the processor 901 is further configured to obtain location information of one or more candidate obstacles, select a candidate obstacle on the road from the one or more candidate obstacles based on the location information of the one or more candidate obstacles, and use the selected candidate obstacle as the target obstacle.

Optionally, when the target object includes the target obstacle on the road, the processor 901 is further configured to obtain speed information of one or more candidate obstacles on the road, select, based on the speed information of the one or more candidate obstacles, a candidate obstacle whose speed is not 0 from the one or more candidate obstacles, and use the selected candidate obstacle as the target obstacle.

Optionally, the processor 901 is further configured to crop the first point cloud based on feature information of a first-type target object, to obtain a first sub-point cloud used to describe the first-type target object, where the target object includes the first-type target object and a second-type target object, and crop the first point cloud based on feature information of the second-type target object, to obtain a second sub-point cloud used to describe the second-type target object. Generating a second point cloud based on the points used to describe the target object includes generating the second point cloud based on the first sub-point cloud and the second sub-point cloud.

In an example, with reference to FIG. 1, the processor 901 may be implemented by using the processor 103 in FIG. 1, and the display 902 may be implemented by using the display 109 in FIG. 1.

For explanations of related content, descriptions of beneficial effects, and the like in any point cloud display apparatus 90 provided above, refer to the foregoing corresponding method embodiment. Details are not described herein again.

Figure 11:
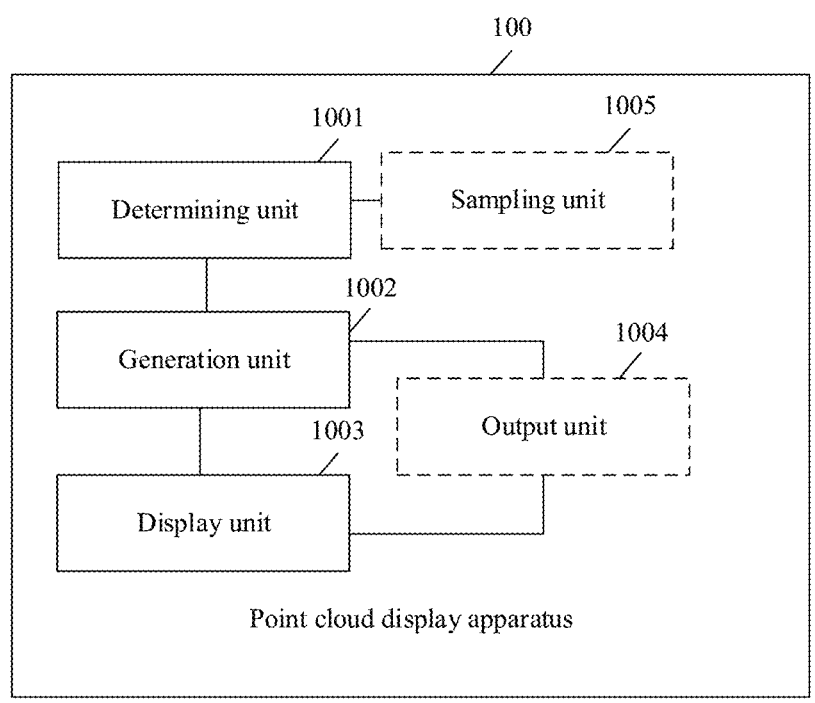
FIG. 11 is a schematic structural diagram of a point cloud display apparatus according to an embodiment of this application.

FIG. 11 is a schematic structural diagram of a point cloud display apparatus 100 according to an embodiment of this application. The apparatus 100 may be configured to perform the foregoing point cloud display method. The apparatus may be applied to an in-vehicle system. The apparatus 100 may include a determining unit 1001, a generation unit 1002, and a display unit 1003. The determining unit 1001 is configured to determine, from a first point cloud, points used to describe a target object, where the first point cloud is a point cloud used to describe a surrounding area of a vehicle in which the in-vehicle system is located. The generation unit 1002 is configured to generate a second point cloud based on the points used to describe the target object, where the target object is an object that needs to be identified by the in-vehicle system. The display unit 1003 is configured to display the second point cloud. For example, with reference to FIG. 3, the determining unit 1001 may be configured to perform S105, the generation unit S106 may be configured to perform S106, and the display unit 1003 may be configured to perform S108.

Optionally, a correlation between the target object and the vehicle exceeds a threshold. The correlation is determined based on at least one of the following factors: a distance between the target object and the vehicle, a location of the target object, information indicated by the target object, or a speed of the target object.

Optionally, as shown in FIG. 11, the apparatus 100 further includes an output unit 1004 configured to present a setting request, where the setting request is used to prompt a user (for example, a driver of the vehicle) to set a type of an object included in the target object. The determining unit 1001 is further configured to determine, based on a received setting response, the type of the object included in the target object.

Optionally, the generation unit 1002 is further configured to generate the second point cloud through sparsification on a third point cloud, where the third point cloud is a set of points used to describe the target object.

Optionally, the apparatus 100 further includes a sampling unit 1005 configured to perform sampling on an original point cloud sequence obtained by the in-vehicle system, to obtain a first point cloud sequence, where the first point cloud is any frame of point cloud in the first point cloud sequence.

Optionally, the sampling unit 1005 is further configured to determine a sampling frequency based on a current scenario of the vehicle in which the in-vehicle system is located, and perform sampling on the original point cloud sequence based on the sampling frequency, to obtain the first point cloud sequence.

Optionally, the determining unit 1001 is further configured to, when the target object includes an object outside a road (for example, a road on which the vehicle is located), crop the first point cloud based on a location of a road marking on a map of a surrounding area of the vehicle, to obtain points used to describe the object outside the road on which the vehicle is located.

Optionally, the determining unit 1001 is further configured to, when the target object includes a target obstacle on a road, determine the target obstacle based on location information or speed information of the object, and crop the first point cloud based on a location and a size of the target obstacle, to obtain points used to describe the target obstacle.

Optionally, the determining unit 1001 is further configured to crop the first point cloud based on feature information of a first-type target object, to obtain a first sub-point cloud used to describe the first-type target object, where the target object includes the first-type target object and a second-type target object, and crop the first point cloud based on feature information of the second-type target object, to obtain a second sub-point cloud used to describe the second-type target object. The generation unit 1002 is further configured to generate the second point cloud based on the first sub-point cloud and the second sub-point cloud.

In an example, with reference to FIG. 1, the determining unit 1001, the generation unit 1002, and the sampling unit 1005 may be implemented by using the processor 103 in FIG. 1, and the display unit 1003 may be implemented by using the display 109 in FIG. 1. The output unit 1004 may be implemented by using the display 109 in FIG. 1, or may be implemented by using another output module/component/device such as a speaker connected to the processor 103 in FIG. 1.

For explanations of related content, descriptions of beneficial effects, and the like in any apparatus 100 provided above, refer to the foregoing corresponding method embodiment. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer-executable instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the word "comprising" does not exclude another component or another step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely examples for description of this application defined by the claims, and are intended to cover any of or all modifications, variations, combinations or equivalents within the scope of this application. It is clearly that a person skilled in the art can make various modifications and variations to this application without departing from the spirit and scope of this application. In this way, this application is intended to cover these modifications and variations of this application provided that they fall within the scope of protection defined by the following claims and their equivalent technologies of this application.

What is claimed is:

1. A method implemented by an in-vehicle system, wherein the method comprises:
    determining, from a first point cloud, first points describing a target object that is to be identified by the in-vehicle system, wherein the first point cloud describes a surrounding area that surrounds a vehicle, wherein the target object comprises a first object and a second object, and wherein the in-vehicle system is located in the vehicle;
    generating a second point cloud based on the first points and through sparsification on a third point cloud that comprises a set of second points that are in a first area and that describe the first object and a set of third points that are in a second area and that describe the second object, wherein a first distance between the first area and the vehicle is greater than a second distance between the second area and the vehicle, and wherein the sparsification comprises sparsification of the set of second points using a first sparsification multiple and sparsification of the set of third points using a second sparsification multiple that is different than the first sparsification multiple; and
    displaying the second point cloud.

2. The method of claim 1, wherein the second point cloud includes the first points, wherein positions of the first points in the second point cloud are the same as positions of the first points in the first point cloud, wherein the method further comprises identifying that a correlation between the target object and the vehicle exceeds a threshold, and wherein the correlation is based on at least one of:
    a distance between the target object and the vehicle;
    a location of the target object;
    information indicated by the target object; or
    a speed of the target object.

3. The method of claim 1, wherein before determining the first points, the method further comprises:
    presenting a setting request prompting a driver of the vehicle to set a type of an object comprised in the target object;
    receiving a setting response; and
    determining, based on the setting response, the type of the object.

4. The method of claim 1, wherein the first sparsification multiple is less than the second sparsification multiple.

5. The method of claim 1, further comprising:
    obtaining an original point cloud sequence; and
    performing sampling on the original point cloud sequence to obtain a first point cloud sequence, wherein the first point cloud is a frame of point cloud in the first point cloud sequence.

6. The method of claim 5, further comprising:
    determining a sampling frequency based on a current scenario of the vehicle; and
    further performing sampling on the original point cloud sequence based on the sampling frequency to obtain the first point cloud sequence.

7. The method of claim 1, further comprising:
    identifying that the target object comprises an object outside a road; and cropping, in response to the identifying, the first point cloud based on a location of a road marking on a map of the surrounding area to obtain third points describing the object outside the road.

8. The method of claim 1, further comprising:
identifying that the target object comprises a target obstacle on a road;
determining, in response to the identifying, the target obstacle based on location information of the target object or speed information of the target object; and
cropping the first point cloud based on a location of the target obstacle and a size of the target obstacle to obtain fourth points describing the target obstacle.

9. The method of claim 1, further comprising:
cropping the first point cloud based on first feature information of a first-type target object to obtain a first sub-point cloud describing the first-type target object, wherein the target object comprises the first-type target object and a second-type target object;
cropping the first point cloud based on second feature information of the second-type target object to obtain a second sub-point cloud describing the second-type target object; and
further generating the second point cloud based on the first sub-point cloud and the second sub-point cloud.

10. An apparatus applied to an in-vehicle system, wherein the apparatus comprises:
a memory configured to store instructions;
a processor coupled to the memory, wherein the instructions cause the processor to be configured to:
determine, from a first point cloud, first points describing a target object that is to be identified by the in-vehicle system, wherein the first point cloud describes a surrounding area that surrounds a vehicle, wherein the target object comprises a first object and a second object, and wherein the in-vehicle system is located in the vehicle; and
generate a second point cloud based on the first points and through sparsification on a third point cloud that comprises a set of second points that are in a first area and that describe the first object and a set of third points that are in a second area and that describe the second object, wherein a first distance between the first area and the vehicle is greater than a second distance between the second area and the vehicle, and wherein the sparsification comprises sparsification of the set of second points using a first sparsification multiple and sparsification of the set of third points using a second sparsification multiple that is different than the first sparsification multiple; and
a display coupled to the processor and configured to display the second point cloud.

11. The apparatus of claim 10, wherein the instructions further cause the processor to be configured to identify that a correlation between the target object and the vehicle exceeds a threshold, and wherein the correlation is based on at least one of:
a distance between the target object and the vehicle;
a location of the target object;
information indicated by the target object; or
a speed of the target object.

12. The apparatus of claim 10, wherein the instructions further cause the processor to be configured to:
present a setting request prompting a driver of the vehicle to set a type of an object comprised in the target object;
receive a setting response; and
determine, based on the setting response, the type of the object.

13. The apparatus of claim 10, wherein the first sparsification multiple is less than the second sparsification multiple.

14. The apparatus of claim 10, wherein the instructions further cause the processor to be configured to:
obtain an original point cloud sequence; and
perform sampling on the original point cloud sequence to obtain a first point cloud sequence, wherein the first point cloud is a frame of point cloud in the first point cloud sequence.

15. The apparatus of claim 14, wherein the instructions further cause the processor to be configured to:
determine a sampling frequency based on a current scenario of the vehicle; and
further perform sampling on the original point cloud sequence based on the sampling frequency to obtain the first point cloud sequence.

16. The apparatus of claim 10, wherein the instructions further cause the processor to be configured to:
identify that the target object comprises an object outside a road; and
crop, in response to the identifying, the first point cloud based on a location of a road marking on a map of the surrounding area to obtain third points describing the object outside the road.

17. The apparatus of claim 10, wherein the instructions further cause the processor to be configured to:
identify that the target object comprises a target obstacle on a road;
determine, in response to the identifying, the target obstacle based on location information of the target object or speed information of the target object; and
crop the first point cloud based on a location of the target obstacle and a size of the target obstacle to obtain fourth points describing the target obstacle.

18. The apparatus of claim 10, wherein the instructions further cause the processor to be configured to:
crop the first point cloud based on first feature information of a first-type target object to obtain a first sub-point cloud describing the first-type target object, wherein the target object comprises the first-type target object and a second-type target object;
crop the first point cloud based on second feature information of the second-type target object to obtain a second sub-point cloud describing the second-type target object; and
further generate the second point cloud based on the first sub-point cloud and the second sub-point cloud.

19. A computer program product comprising computer-executable instructions that are stored on a non-transitory computer-readable medium and that, when executed by a processor, cause an in-vehicle system to:
determine, from a first point cloud, first points describing a target object that is to be identified by the in-vehicle system, wherein the first point cloud describes a surrounding area that surrounds a vehicle, wherein the target object comprises a first object and a second object, and wherein the in-vehicle system is located in the vehicle;
generate a second point cloud based on the first points and through sparsification on a third point cloud that comprises a set of second points that are in a first area and that describe the first object and a set of third points that are in a second area and that describe the second object, wherein a first distance between the first area and the vehicle is greater than a second distance between the second area and the vehicle, and wherein the sparsification comprises sparsification of the set of second points using a first sparsification multiple and sparsification of the set of third points using a second sparsification multiple that is different than the first sparsification multiple; and display the second point cloud.

20. The computer program product of claim 19, wherein the computer-executable instructions further cause the in-vehicle system to identify that a correlation between the target object and the vehicle exceeds a threshold, and wherein the correlation is based on at least one of:

a distance between the target object and the vehicle;
a location of the target object;
information indicated by the target object; or
a speed of the target object.

\* \* \* \* \*